United States Patent
Speed

[19]

[11] Patent Number: 5,563,626
[45] Date of Patent: Oct. 8, 1996

[54] SMOOTH TEXT DISPLAY SYSTEM

[75] Inventor: Robin C. B. Speed, Winchester, United Kingdom

[73] Assignee: International Business Machines Corporation, Armonk, N.Y.

[21] Appl. No.: 242,903

[22] Filed: May 13, 1994

[30] Foreign Application Priority Data

May 14, 1993 [GB] United Kingdom ............ 9309986

[51] Int. Cl.$^6$ ................................................ G09G 5/22
[52] U.S. Cl. ........................ 345/141; 345/128; 345/143
[58] Field of Search .............................. 345/141, 142, 345/143, 144, 128, 129, 130, 192, 193, 194, 195; 395/144, 150, 151

[56] References Cited

U.S. PATENT DOCUMENTS 5,175,811  12/1992  Sone et al. ............... 345/194
5,185,818   2/1993  Warnock .................. 345/143

Primary Examiner—Richard Hjerpe
Assistant Examiner—Xiao M. Wu
Attorney, Agent, or Firm—Martin J. McKinley; Duke W. Yee; Andrew J. Dillon

[57] ABSTRACT

In a text display system facilitating the editing of text, smooth and flicker free updates to text displayed using proportionally spaced fonts are effected by interleaving the characters of an original and an updated text according to their associated cumulative character widths by sequentially storing each lesser cumulative character width and each character in buffers thereby establishing the order of display of the interleaved characters according to each original and updated cumulative character widths. The interleaved characters are then displayed according to the order of storage thereby incrementally displaying and deleting characters of the updated and original texts respectively such that an original character is deleted and replaced by an appropriate number of updated text characters resulting in a smooth text update.

21 Claims, 11 Drawing Sheets

WRITING 'M'

WRITING 'i'

WRITING 'E'

WRITING 'r'

WRITING 's'

WRITING 't'

WRITING 'i'

WRITING 'j'

WRITING 'k'

WRITING 'A'

WRITING 'C'

WRITING 'B'

WRITING 'l'

WRITING 'D'

WRITING 'm'

WRITING 'i'

WRITING 'r'

WRITING 's'

WRITING 'E'

WRITING 't'

SMOOTH TEXT DISPLAY SYSTEM

BACKGROUND OF THE INVENTION

1. Technical Field

The present invention relates to a smooth text display system for effecting flicker-free text updates.

2. Description of the Related Art

Most word processing application programs which are run in a windowed environment, such as IBM Operating System/2, utilize the functions indigenous to that operating system to reflect various edit operations, such as block cut and paste or move, effected on a document. "IBM" and "Operating System/2" are trademarks of International Business Machines Corporation.

In conventional word processing systems when currently displayed text is updated, the old text must be removed from the display prior to the updated text being displayed. The replacement of the text can be effected in a number of ways. Firstly, if the text is tied to a regular rectangular grid, an update would be effected by merely replacing the original characters with the updated characters. However, if the text is more free-form or proportionally spaced, such as that employed by IBM's Operating System/2 Presentation Manager, erasing the old text is more problematic. "Presentation Manager" is a trademark of International Business Machines Corporation. Individual character spacing and positioning information is required when a character string is written to the screen. In order to delete a text often a blank rectangle overwriting the old text to be updated is drawn followed by writing the updated text. However, this can cause an appreciable amount of undesirable flicker or a flash when a significant number of characters are updated due to the efficacy with which a display system can effect such an update.

IBM Technical Disclosure Bulletin, Vol. 31, No. 10, March 1989, Clegg et al. discloses a method of eliminating alphanumeric flicker on display screens which does not provide direct access to the bit planes of the display. The method assigns to each character representation to be displayed an additional attribute, referred to as the clean bit. The clean bit allows the hardware to make decisions regarding the character being written based upon the status of the character's clean bit. If the clean bit is "on" the hardware leaves the current character position on the screen unchanged, and proceeds to the next character position within the buffer. If the clean bit is "off" the hardware places the character into the bit planes in the conventional manner, turns the clean bit, for that character, "on" and progresses to the next character in the buffer. The software which places new characters in the buffer implements the following algorithm:

(a) compare the character in the buffer with the new character;

(b) if the characters are the same in all respects (excluding the clean bit), leave the position unchanged; or (c) if the characters are not the same in all respects (excluding the clean bit), then update the position with the new character and turn the clean bit "off".

This combination of algorithms causes the bit planes to be updated only when the character on the display will be changed in some respect. However, it is noted that the method disclosed by Clegg et al. would only be suitable for use within a system employing text which is tied to a rectangular grid and would be ineffective within a system utilizing proportional spacing. Within a system using a tied grid the bit pattern representing an updating character completely overwrites the bit pattern representing an original character within a predefined region thereby avoiding the problems associated with proportionally spaced systems.

SUMMARY OF THE INVENTION

An object of the present invention is to provide a smooth text display system and method for effecting smooth, flicker-free text updates within a system using proportionally spaced text.

Accordingly, a first embodiment of the present invention provides a text display system including means for receiving and storing an original text, means for receiving and storing an updated text reflecting changes to the original text and means for displaying the updated text using proportionally spaced fonts, the system characterized by means for determining the width of each character used within the system when displaying the characters;

means for associating each character of the updated and original texts with a corresponding character width according to the character width determination;

means for sequentially accessing each character and associated character width of the original and updated texts respectively;

means for calculating a cumulative character width for each character of both the original and updated texts and comparing the cumulative character widths to identify the lesser;

means for interleaving the characters of the original and updated texts and associated cumulative character widths by sequentially storing each said lesser cumulative character width and each associated character in a first and second buffer respectively thereby establishing the order of display of the interleaved characters according to each original and updated cumulative character width;

means for calculating the difference between contiguous interleaved cumulative character widths thereby determining a display position for each interleaved character; and means for sequentially displaying the interleaved characters according to the order at the display positions thereby incrementally displaying and deleting characters of the updated and original texts respectively such that an original character is deleted and replaced by an appropriate number of updated text characters resulting in a smooth text update.

According to another aspect of the first embodiment of the present invention there is provided a method of text display including receiving and storing an original text, receiving and storing an updated text reflecting changes to the original text and displaying the updated text using proportionally spaced fonts, the method comprising the steps of:

determining the width of each character when displaying the characters;

associating each character of the updated and original texts with a corresponding character width according to the character width determination;

sequentially accessing each character and associated character width of the original and updated texts respectively;

calculating a cumulative character width for each character of both the original and updated texts and comparing the cumulative character widths to identify the lesser;

interleaving the characters of the original and updated texts and associated cumulative character widths by sequentially storing each lesser cumulative character width and each associated character in a first and second buffer respectively thereby establishing the order of display of said interleaved characters according to each original and updated cumulative character width;

calculating the difference between contiguous interleaved cumulative character widths thereby determining a display position for each interleaved character; and sequentially displaying the interleaved characters according to the order at the display positions thereby incrementally displaying and deleting characters of the updated and original texts respectively such that an original character is deleted and replaced by an appropriate number of updated text characters resulting in a smooth text update.

Preferably, an embodiment of the present invention would substantially minimize any areas of blank screen which may result as a consequence of effecting an update.

Appropriately, a second embodiment of the present provides a text display system including means for receiving and storing an original text, means for receiving and storing an updated text reflecting the changes to the original text and means for displaying the updated text according to proportionally spaced fonts, said system characterized by means for determining the width of each character used within the system when displaying the characters;

means for calculating and associating with each character of the updated and original texts a corresponding character end position according to the character width determination;

means for associating a flag indicating a character type with each character of the original and updated texts;

means for copying all associated character end positions and flags to a common buffer;

means for arranging the character end positions and flags within the common buffer according to the character end positions;

means for calculating the difference between contiguous arranged character end positions and storing the differences back in the common buffer;

means for identifying the minima of the differences thereby determining where the original and updated texts have the closest match in terms of character end positions;

means responsive to the minima and the character end positions for displaying all updated characters followed by all original characters between consecutive minima thereby incrementally displaying and deleting characters of the updated and original texts respectively such that an original character is deleted only upon prior replacement by an appropriate number of updated text characters resulting in a smooth text update.

According to a further aspect of the second embodiment of the present invention there is provided a method of text display including receiving and storing an original text, receiving and storing an updated text reflecting the changes to said original text and displaying the updated text according to proportionally spaced fonts, the method including the steps of:

determining the width of each character when displaying the characters;

calculating and associating with each character of the updated and original texts a corresponding character end position according to the character width determination;

associating a flag indicating a character type with each character of the original and updated texts;

copying all associated character end positions and flags to a common buffer;

arranging the character end positions and flags within the common buffer according to the character end positions;

calculating the difference between contiguous arranged character end positions and storing said differences back in the common buffer;

identifying the minima of said differences thereby determining where the original and updated texts have the closest match in terms of character end positions;

displaying all updated characters followed by all original characters between consecutive minima thereby incrementally displaying and deleting characters of the updated and original texts respectively such that an original character is deleted only upon prior replacement by an appropriate number of updated text characters resulting in a smooth text update.

The original or updating texts which are displayed on the display means may vary in length. If the updates are relatively minor, for example, the insertion of a number of characters into a line or the correction of a typographical error, the width of the characters constituting the updating text may be less than the maximum number of pixels per line or the maximum number of lines per screen which the displaying means is capable of displaying. Further, it is common practice to execute separate applications within separate display areas, commonly referred to in the art as windows. The display areas or windows do not necessarily wholly coincide with maximum available display area of the screen.

Accordingly, a particular embodiment of the invention provides a text display system wherein the maximum widths of the updated or original texts correspond to the maximum number of pixels constituting a single line of a display area.

There are instances where the updating text may span more than one line, such as effecting a block cut and paste command as is conventional in word processing. In such cases it may be necessary to update the whole screen or display area or part thereof.

Appropriately, a further embodiment of the present invention provides a text display system wherein the maximum width of the updated or original texts is less than or equal to the maximum number of pixels constituting a display area or screen.

It is evident that the efficacy of a text display system can be increased if provision is made to determine whether a single line or a partial or complete screen or display area update is required. This can be achieved by determining the width of the updating text, in terms of the total number of pixels, prior to displaying the updating text.

Accordingly, a still further embodiment of the present invention provides a text display system further including means responsive to the total width of the updating text for determining whether a single line or a partial or complete screen or display area update is required.

The above as well as additional objects, features, and advantages of the present invention will become apparent in the following detailed written description.

BRIEF DESCRIPTION OF THE DRAWINGS

Embodiments of the invention will now be described, by way of example, with reference to the accompanying drawings in which.

DETAILED DESCRIPTION OF PREFERRED EMBODIMENT

Figure 1:
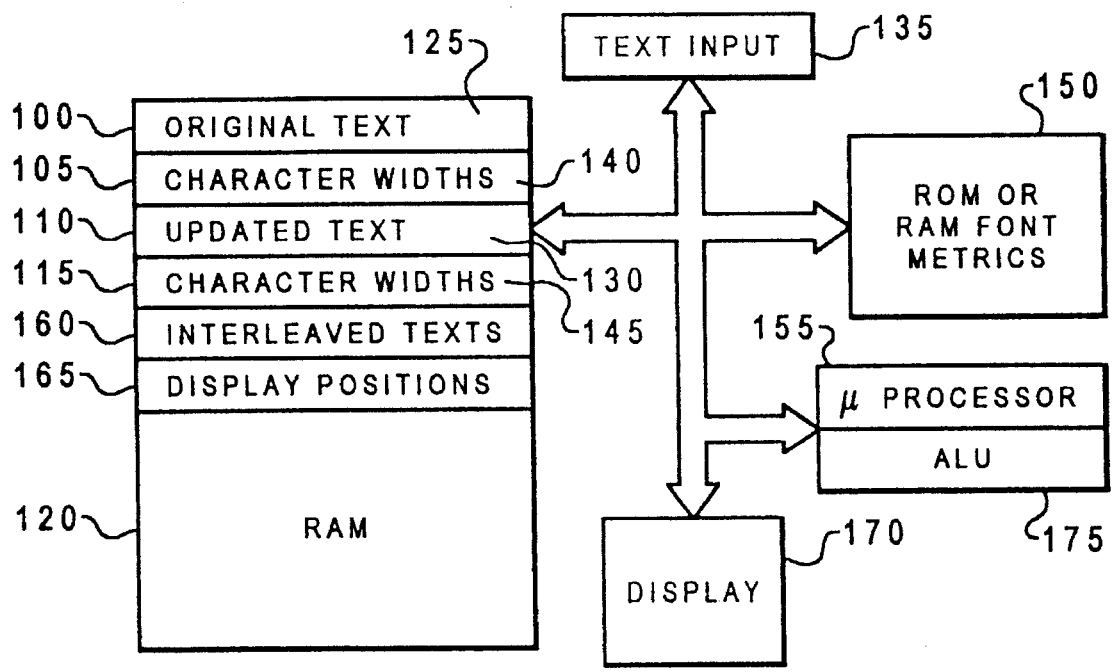
FIG. 1 shows a system for effecting smooth text updates according to the present invention.

In FIG. 1 there is shown a text display system according to the present invention comprising four buffers 100, 105, 110, 115, realized using random access memory 120, for receiving and storing an original text 125 and an updated text 130, the latter reflecting any changes to the original text as a consequence of an edit operation effected via keyboard or other device 135, together with the each character's width 140 and 145 in terms of the number of pixels, a read only memory 150 for storing the font metrics used within the system, a microprocessor 155 utilized for executing addressing and data manipulation instructions and interleaving said texts according to predetermined schemes thereby determining the order of display of the interleaved texts 160, and a video display unit 170 for displaying said interleaved texts at the appropriate display positions 165.

Figure 2A:
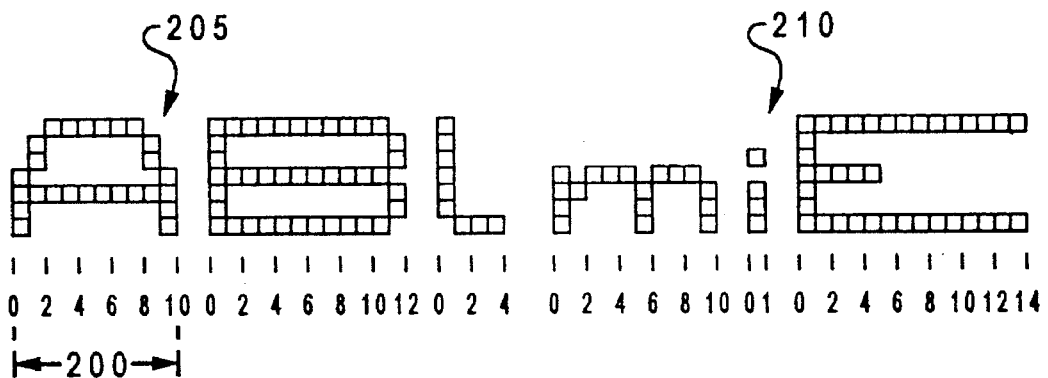
FIGS. 2A and 2B show the composition of various characters according to a proportionally spaced text font.
Figure 2B:
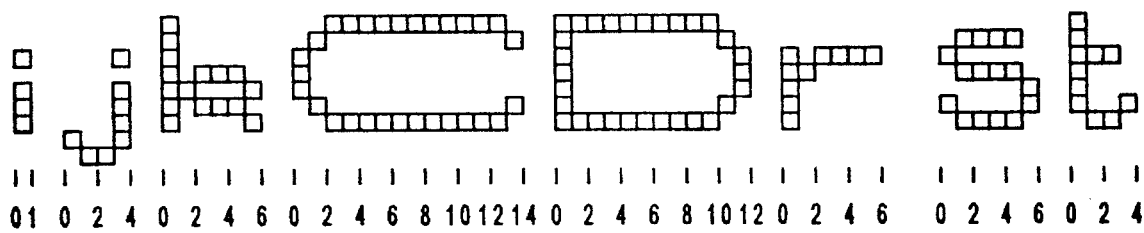

FIG. 2 shows the composition of various characters according to a proportionally spaced text font. It can be seen that each character has a "width" 200 which can be stated in terms of the number of pixels wide a particular character is. The letter "A" 205, for example, is ten pixels wide whereas the letter "i" 210 is only one pixel wide. Consequently, replacing the letter "A" 205 with the letter "i" 210 would decrease the width of a text containing those letters by nine pixels. Any new insertion or deletion of characters would lead to a misalignment between corresponding characters in the original and updated texts respectively.

Figure 3A:
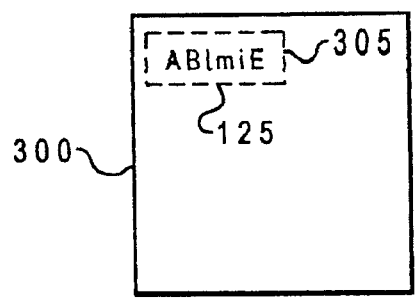
FIGS. 3A to 3C show the updating of text using a proportionally spaced text font according to the prior art.
Figure 3B:
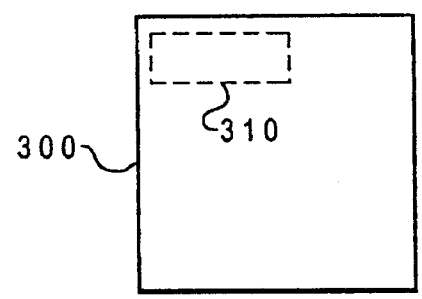
Figure 3C:
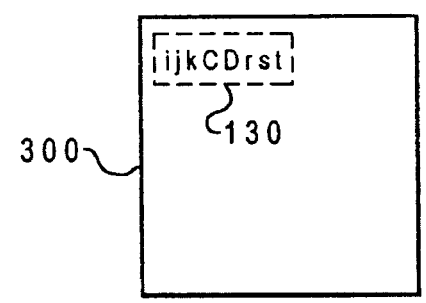

Referring to FIGS. 3A to 3C, there is shown the updating of text on a conventional display system using a proportionally spaced font. Within a conventional word processing system the text, as displayed on the screen, and the text reflecting the updated status of the displayed text may be held in different buffers. An update is effected by writing a blank rectangle 310 to the screen or display area 300 in the area 305 which the original text 125 currently occupies. The updated text 130 is then written over the blank rectangle 310. Following an update, the original text 125 may be discarded and the updated text 130 will be transferred to the original text buffer 100. It will be appreciated that if large updates are effected, the area of the blank rectangle 310 can be substantial and, as a consequence of the efficacy of text display systems, such an updated would manifest itself as a flash or flicker.

Figure 4:
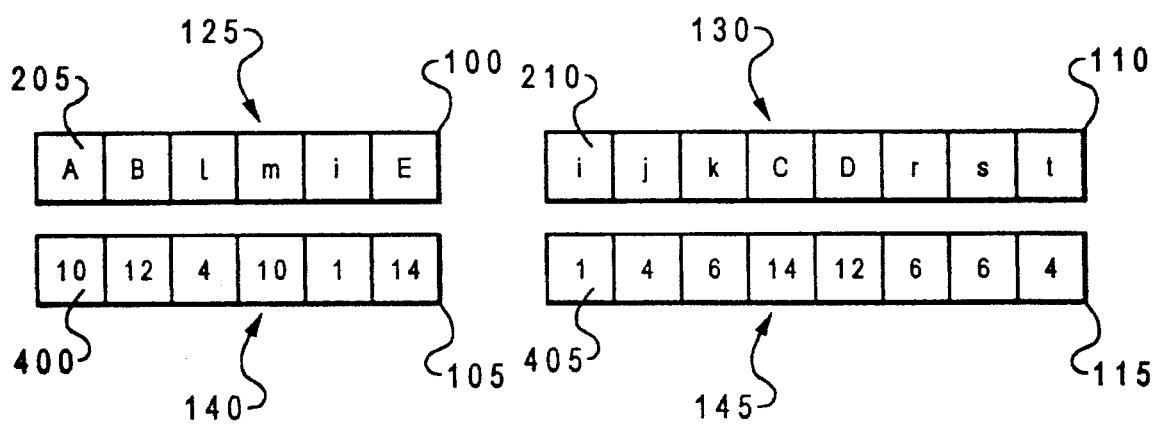
FIG. 4 shows two buffers containing an original and an updated text together with their corresponding character widths prior to effecting an update according to the present invention.

In FIG. 4 there are shown four buffers 100, 105, 110, 115 containing the original 125 and the updated 130 text and each character's corresponding character width 140 and 145. Each storage element of the first buffer 100 contains a single character of the original text 125, e.g. an "A" 205. Each storage element of the second buffer 105 contains a representation of the width 400 of the character in the corresponding position of the first buffer 100. Each storage element of the third buffer 110 contains a single character of the updated text 130, e.g. an "i" 210. Each storage element of the fourth buffer 115 contains a representation of the width 405 of the character in the corresponding position of the third buffer 110. The buffers can be realized using suitably dimensioned array data structures such as provided by many high level programming language. The array data structure being stored in random access memory 120 together with appropriate addressing instructions executed by the microprocessor 155 can together constitute the means for associating each character of the updated and original texts with a corresponding character width. The information relating to the widths of the characters can be ascertained by interrogating the system upon which a particular embodiment of the present invention is implemented in the conventional manner. It will be appreciated that a microprocessor 155 executing the correct addressing instructions to access, for example, either a read-only or a random-access memory suitably programmed with a table of font metrics taken together can constitute the means for determining the width of each character used within the system when displaying text. It can be seen from FIG. 4 that the original text 125 comprises the characters "ABlmiE" having widths 140 of 10, 12, 4, 10, 1 and 14 respectively and the updated text comprises characters "ijkCDrst" having widths 145 of 1, 4, 6, 14, 12, 6, 6 and 4 respectively.

Figure 5:
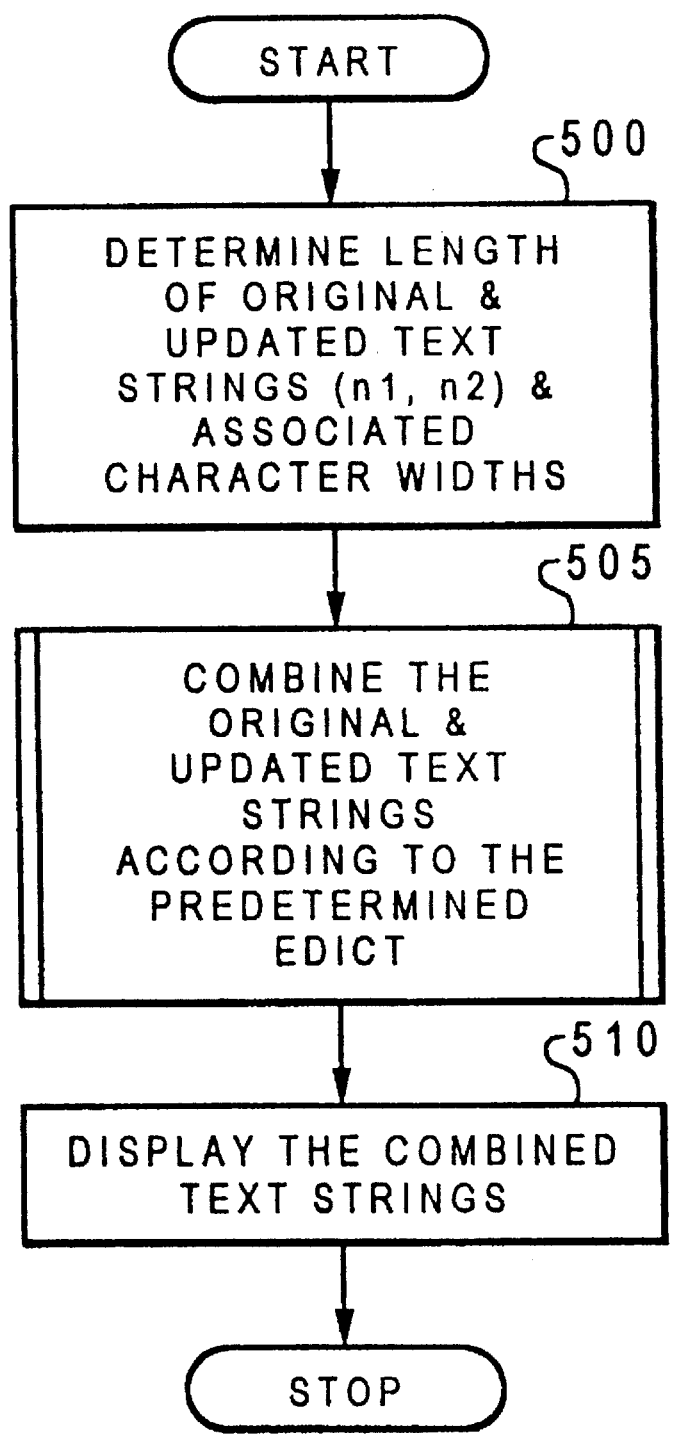
FIG. 5 shows a flow diagram for effecting an update according to a first embodiment of the present invention.

FIG. 5 shows a flow diagram for updating text according to a first embodiment of the present invention. The length of the updated 130 and original 125 texts, in terms of total number of characters each and the corresponding cumulative character widths are determined in the conventional manner at 500. It will be apparent to one skilled in the art that the total length and the means for calculating the cumulative character widths for each character of both the original and updated texts can be realized using the mathematical functions of the arithmetic and logic unit 175 of the microprocessor 155 in conjunction with the font metrics. The updated 130 and original 125 texts and their associated character widths 115 and 105 are interleaved according to a predetermined edict at 505. Finally, the interleaved updated and original texts are displayed using, for example, an exclusive-or technique at 510 in the conventional manner.

Figure 6:
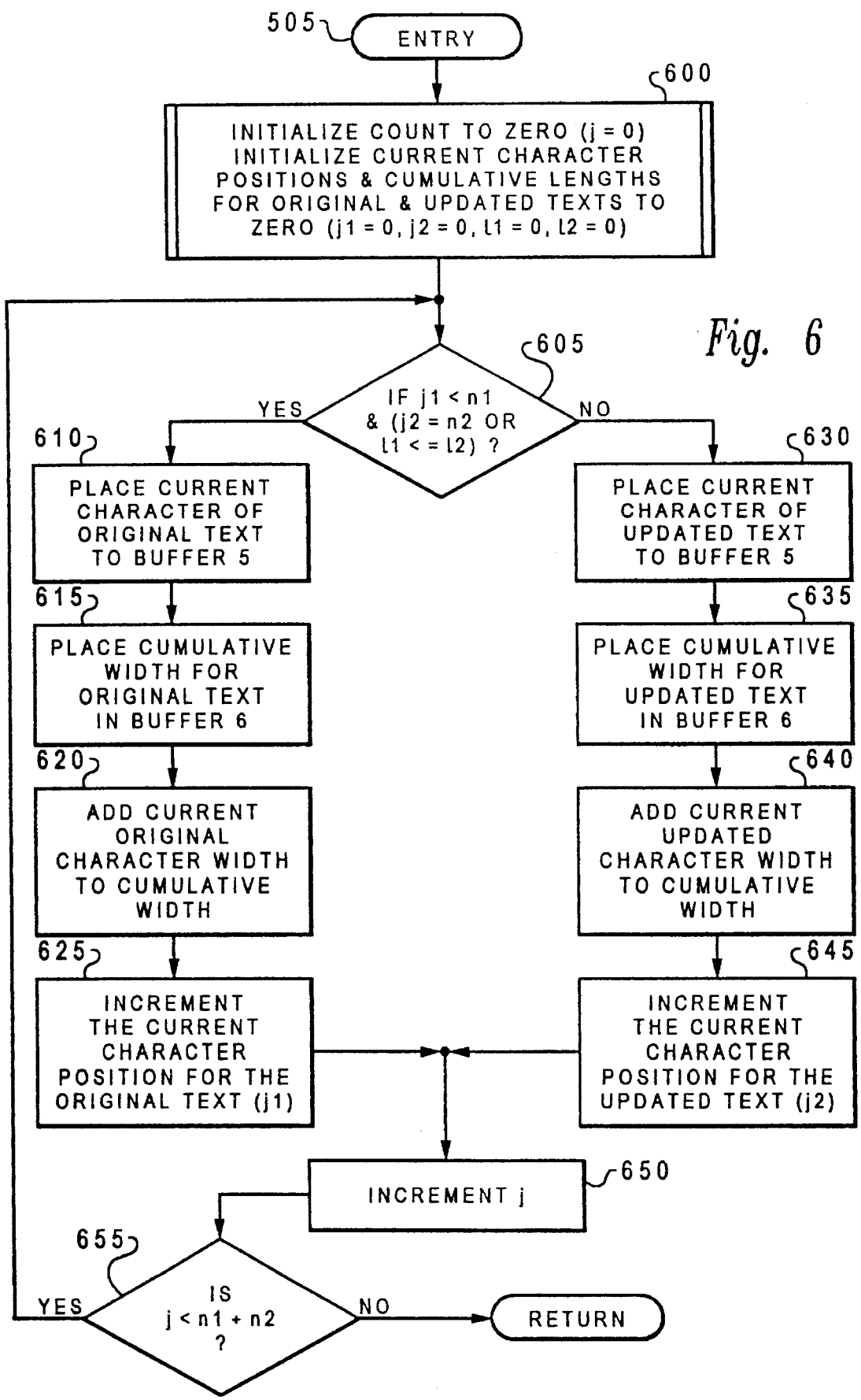
FIG. 6 shows in more detail the second step of the flow diagram illustrated in FIG. 5 according to a first embodiment of the present invention.

In FIG. 6 there is shown, in more detail, the second step 505 of the flow diagram illustrated in FIG. 5. Initialization takes place at 600. Counters representing the current position of a fifth 160 and sixth 165 buffer position (j=0), the current updated text character position (j2=0), the current original text character position (j1=0), the current updated text cumulative character width (l2=0) and the current original text cumulative character width (l1=0) are initialized at 600. The microprocessor 155 executing appropriate array data structures access instruction provides the means for sequentially accessing each character and associated character widths of the original and updated texts respectively.

The predetermined edict or scheme for interleaving the updated and original texts is shown at 605. The result of the edict determines the next character added to the fifth 160 buffer at the current buffer position.

If the result of the edict is true, a current character of the original text 125 is added to the fifth buffer 160 at 610. Also the corresponding original text cumulative character width is added to the current position of the sixth buffer 165 at 615. The width of the current original text character is added to the current original text cumulative character width at 620 and the current original text character position is incremented by one at 625.

If the result of the edict is false, a current character of the updated text is added to the fifth buffer 160 at 630. The current updated text cumulative character width is added to the current position of the sixth buffer 165 at 635. The width of the current updated character is added to the current updated text cumulative character width at 640 and the current updated text character position is incremented by one at 645.

The fifth 160 and sixth 165 current buffer positions are incremented by one and tested to ascertain whether or not there are any characters left to process at 650 and 655 respectively. If so, control returns to 605 and the above is repeated. If not, the interleaved updated and original characters can be displayed.

The interleaved characters are displayed according to the order in which they were added to the fifth buffer 160. The microprocessor 155 executing appropriate instructions in conjunction with the array data structures or buffers stored in random access memory 120 constitute the means for interleaving the characters of the original and updated texts and associated cumulative character widths by sequentially storing each said lesser cumulative character width and each associated character in a first and second buffer respectively thereby establishing the order of display of said interleaved characters according to each original and updated cumulative character width.

Figure 7:
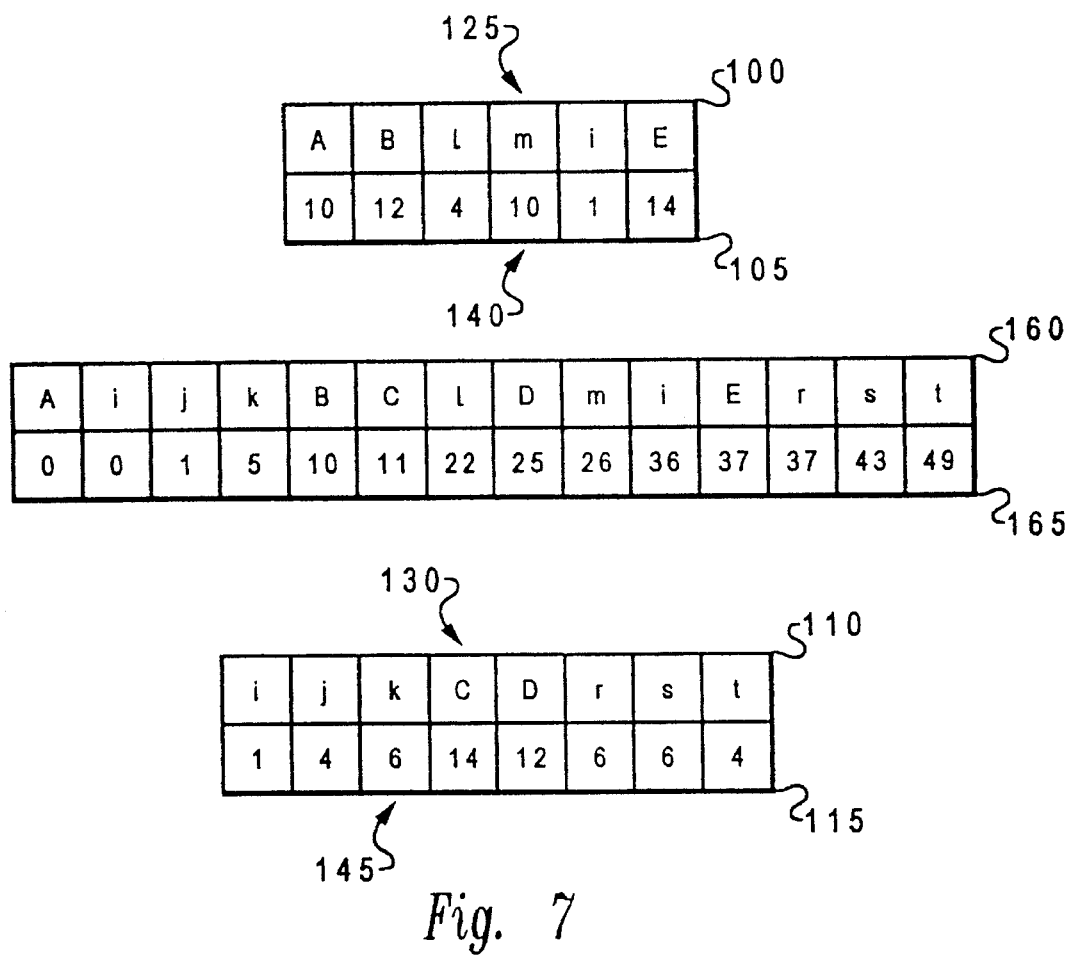
FIG. 7 illustrates how the original and updated texts are interleaved prior to effecting an update according to a first embodiment of the present invention.

Referring to FIG. 7, there are shown the first 100 and second 105 buffers. as described above. containing the original text 125 and corresponding character widths 140, the third 110 and fourth 115 pair of buffers, containing the updated text 130 and corresponding character widths 145, reflecting the updates to be effected to the original text 125 and a fifth 160 and sixth 165 pair of buffers whose lengths equal the combined lengths of the first 100 and third 110 and the second 105 and fourth 115 buffers respectively. The fifth buffer 160 is for receiving and storing the interleaved texts of the first 100 and third 110 buffers. The sixth buffer 165 is for receiving and storing the corresponding interleaved cumulative character widths of the second 105 and fourth 115 buffers. Notwithstanding the use of dynamic length buffers in a particular embodiment of the present invention, it will be evident to one skilled in the art that appropriate fixed length buffers would also suffice. The original 125 and updated 130 texts and cumulative character widths 105 and 115 are interleaved, on a character-by-character basis, according to the following more detailed exposition of step 605 of FIG. 6:

if the end of the original text has not been reached and either the current cumulative character width total of the updated text is less than or equal to the cumulative character width total of the original text or the end of the updated text has been reached then insert into the fifth buffer the current original character indicated by the current character position of the first buffer, insert into the sixth buffer the current cumulative character width of the original text, add to the current cumulative character width of the original text the width of that character and increment the current character position of the original text by one else insert into the fifth buffer the current updated character indicated by the current character position of the third buffer, insert into the sixth buffer the current cumulative character width of the updated text, add to the current cumulative character width for the updated text the width of that character and increment the current character position of the updated text by one.

The effect of the above edict is to interleave the characters and cumulative character widths of the original 125 and updated 130 texts and to store the results in the fifth 160 and sixth 165 buffers respectively. The order of interleaving is such that when the interleaved characters are written to the screen at their respective display positions the area of blank screen which would normally result when effecting an update in a conventional manner is dramatically reduced or substantially obviated.

Figure 8:
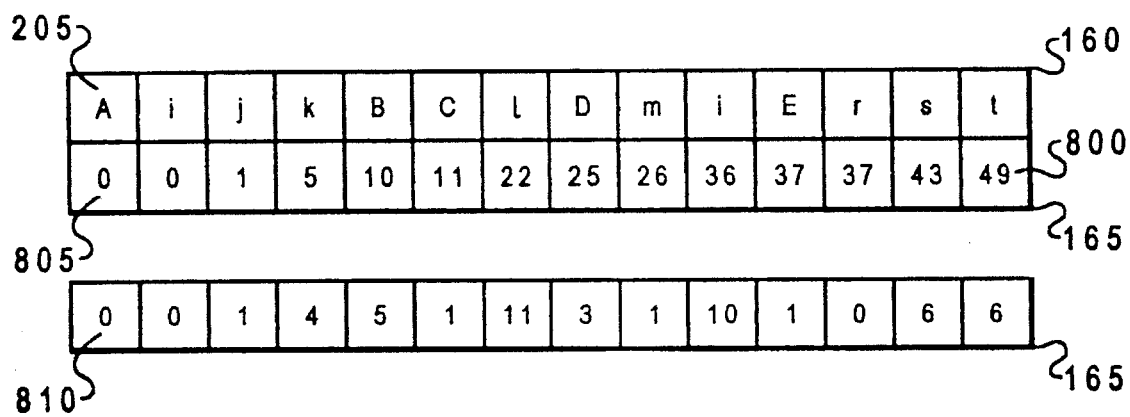
FIG. 8 illustrates the calculations to determine the difference between contiguate cumulative character widths according to a first embodiment of the present invention.

The difference between contiguate cumulative character widths in the sixth buffer 165 is calculated, commencing with the last element in the buffer and working towards the first element of the buffer. The result of the above calculations are stored back in the sixth buffer 165, as exemplified by FIG. 8. The implementation of the difference calculation can be realized using the arithmetic and logic unit 175 of the microprocessor 155 together with suitable instructions and would as a whole constitute a means for calculating the difference between contiguate interleaved cumulative character widths thereby determining a relative display position for each interleaved character. The resultant difference represents the relative spacing of the interleaved characters when written to the screen. It can be seen that the "A" 205 would be drawn at a relative position "0" 810. That is "0" pixels from the current display position.

Figure 9A:
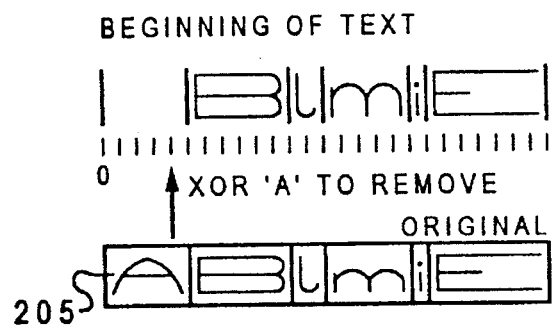
FIGS. 9A to 9N illustrate how the interleaved characters and corresponding differences are utilized when writing the updated text to and removing the original text from the display means according to a first embodiment of the present invention.
Figure 9B:
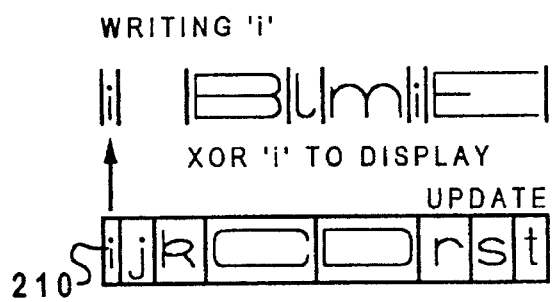
Figure 9C:
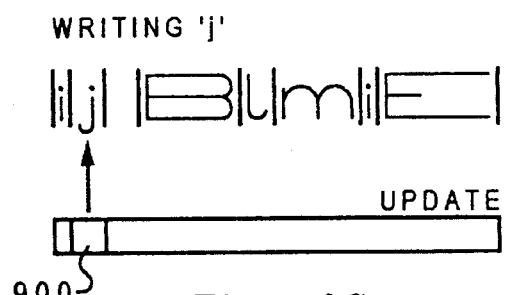
Figure 9D:
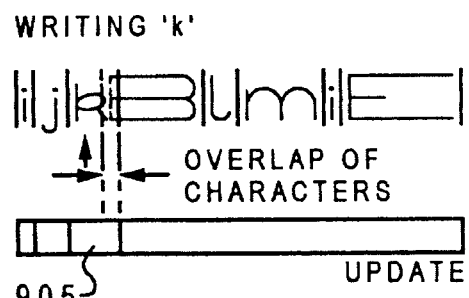
Figure 9E:
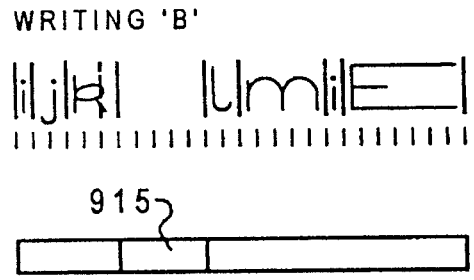
Figure 9F:
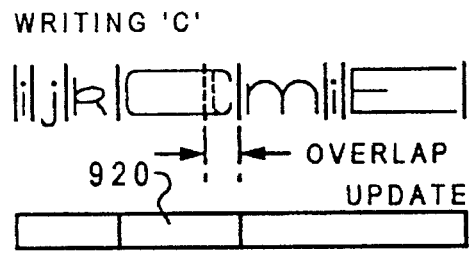
Figure 9G:
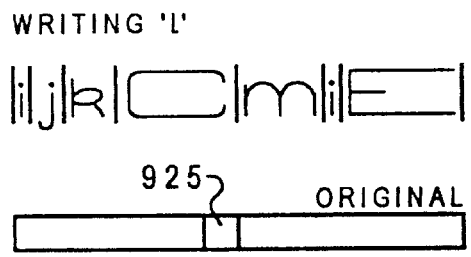
Figure 9H:
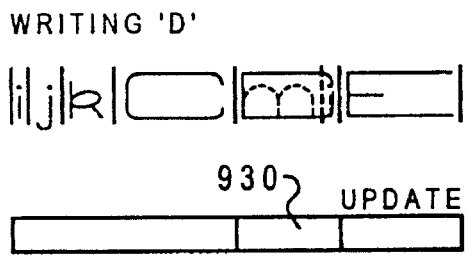
Figure 9I:
Figure 9J:
Figure 9K:
Figure 9L:
Figure 9M:
Figure 9N:

FIGS. 9A to 9N illustrate the sequence in which the interleaved characters are written to the screen in order effect an update. The contents of the fifth buffer 160 are written to the screen using a conventional exclusive-or technique, such as that of the "GphCharStringPosAt" function utilized in IBM's Operating System/2 Presentation Manager, at the relative distances contained in the sixth buffer 165. The use of such a function together with the microprocessor 155 can form a means for sequentially displaying said interleaved characters according to said order at said display positions thereby incrementally displaying and deleting characters of the updated and original texts respectively such that an original character is deleted and replaced by an appropriate number of updated text characters resulting in a smooth text update.

Consequently the order and effect of writing the interleaved text in conjunction with the relative distances is as follows:

(a) the "A" 205 is written, thereby deleting the existing "A", as in FIG. 9A;

(b) the characters "i" 210, "j" 900 and "k" 905 are written, thereby displaying those characters, as exemplified by FIGS. 9B, 9C and 9D;

(c) the "B" 915 is written, thereby deleting the existing "B" as shown in FIG. 9E;

(d) the "C" 920 is written, thereby displaying that character, as illustrated by FIG. 9F;

(e) the "l" 925 is written, thereby deleting that character, as depicted in FIG. 9G;

(f) the "D" 930 is written, thereby displaying that character, as shown in FIG. 9H;

(g) the "m" 940, "i" 945 and "E" 950 are written, thereby deleting the existing "m", "i", and "E", as illustrated by FIGS. 9I, 9J, and 9K;

(h) the remaining "r" 955, "s" 960 and "t" 965 are written, thereby displaying those characters, as depicted in FIGS. 9L, 9M and 9N./

Table 1 illustrates the pseudo-code for certain aspects of the first embodiment of the present invention. In the first embodiment of the invention the following variables are defined as global using C, "char *page1[ ]={ . . . }" and "char *page2[ ]={ . . . }", and correspond to pages of the original and updated texts respectively, and a buffer for storing the character widths used by the system, static LONG alWidths [256]. Notwithstanding the declaration of the above variables as global variables in the specific embodiment of the invention as described herein, the invention is not limited to such declarations. It can equally be implemented utilizing local variables.

Further, in spite of the first embodiment of the present invention effecting updates using text strings on a line-by-line basis it is not limited to the same. It is equally contemplated that the length of the updating and original texts can span more than a single line of the screen or display area.

Referring to Table 2, for the purposes of illustrating the present invention, the call to the function embodying the first embodiment of the invention has been made utilizing a parameter which has been explicitly set to a Boolean value of either "TRUE" or "FALSE". It will be evident to one skilled in the art that a word processing system incorporating the first embodiment of the present invention would have a more sophisticated means of determining the state of Boolean parameter passed to the function DoPage( ). Such a sophisticated means may comprise, for example, setting the parameter to TRUE when either the system detects keystrokes, which may be indicative of a user editing text, or an update text is input from, say, a storage medium for subsequent display.

It can be inferred from Table 3, describing the function DoPage( ), that if the Boolean parameter passed to the function is FALSE, the system would merely display the original text 125 as is. However, if the Boolean parameter passed to function is TRUE, the system would reflect the updates to the original text on the display in a smooth manner according to the teachings of the present invention. Within the function DoPage( ) it can be observed that the second 105 and fourth 115 buffers, referred to above, are implemented as a single two dimensional array, width [2][80]. The first 100 and third 110 buffers correspond to the individual lines of each page of the original 125 and updated 130 texts, *page1[ ] and *page2[ ] respectively. Each page can be dimensioned according to the number of lines available on the display means or other convenient number. Referring again to Table 1, for the purposes of demonstrating the operation of the invention an embodiment having a page length of four lines was chosen, char *page1[4] and char *page2[4].

TABLE 1

```
/* Define character width buffer */
static LONG alWidths[256];
/* Define sample original text : first buffer */
char *page[4] = {
"The main procedure obtains an anchor block handle, and
creates the",
"application message queue. It invokes the FonttestInitApp
function",
"to perform initialization-related tasks, such as creating
a window",
"and initializing static strings, The main procedure also
contains " };
/* Define sample updated text : third buffer */
char *page2[4] = {
"application message queue. It invokes
FonttestInitInitAppfunction",
"to perform initialization-related tasks, such as creating
a window",
"and initializing static strings. The main procedure ale
also contains" };
```

TABLE 2

```
/* Ascertain from system the character widths and store in
buffer
"alWidths */
GpiQueryWidthTable (hps, OL, 256L, alWidths);
/* Call the function which embodies the invention. A call to the
function with a FALSE parameter would result in the
original text being displayed. */
DoPage (FALSE);
/* Pause */
DosSleep (3000L);
/* Call the function which embodies the invention. A call to the
function with a TRUE parameter would result in the
updated text being displayed in a smooth manner. */
DoPage (TRUE);
```

TABLE 3

```
void DoPage (BOOL doXOR)
{
/* Define variables used within the function */
int i;
int j;
int n1, n2;
/* Define buffers used within the function */
    static LONG widths [2][80];      /* Second and fourth
Buffers */
    static char bothchar [160];        /* Fifth Buffer */
    static LONG bothwidth [160];       /* Sixth Buffer */
if the "doXor" parameter is FALSE the erase the screen;
/* Establish a count corresponding to the number of lines
per page or the length of the updating or origingal texts */
    for (i = 3; i > 0; i—)
{
    /* Determine the length of the current line of the
original text */
    n1 = strlen(page1[i]);
    /* Place into the second buffer the widths of the
characters comprising the current line of the original text
*/
    for (j = 0; j < n1; j++) width [0][j] =
alWidths[page1[i][j];
    /* If the parameter "doXOR" is true, update the original
text */
    if (doXOR)
{
    LONG 11, 12; /* Define cumulative character width
totals */
    int j1, j2; /* Define current character position
variables */
    /* Determine the length of the current line of the updated
text */
    n2 = strlen(page2[i]);
    /* Place into the fourth buffer the widths of the
```

TABLE 3-continued

```
characters comprising the current line of the updated text
*/
    for (j = 0; j < n2; j++) widths [l][j] =
alWidths[page2[i][j]];
/* Establish a count to interleave the current lines of
original and
updated texts */
    for (j = 0, j1 = 0, j2 = 0, 12 = 0; j < n1 +
n2; j++)
    {
/* interleaved the contents of the current lines of the
original and updated texts according to the following:
        if the end of the original text has not been reached
        and either the current cumulative character width
        total of the updated text is less than or equal to the
        cumulative character width total of the original text
        or the end of the updated text has been reached
        then
        insert into the fifth buffer the current original
        character indicated by the current character position
        of the first buffer, insert into the sixth buffer the
        current cumulative character width of the original
        text, add to the current cumulative character width of
        the original text the width of that character and
        original text by one
        else
        insert into the fifth buffer the current updated
        character indicated by the current character position
        of the third buffer, insert into the sixth buffer the
        current cumulative character width of the updated
        text, add to the current cumulative character width
        for the updated text the width of that character and
        increment the current character position of the
        updated text by one. */
        if (j1 < n1 && (j2 ==n2 ||
            l1 <= l2))
        {
        /* Add the current character pointed to by the
        current character position variable, j1, of the
        current line of the original text to the fifth
        buffer */
        bothchar[j] = page1[i][j1];
        /* Add the current cumulative character width for
        the original text to the sixth buffer */
        bothwidth[j] = l1;
        /* Calculate the cumulative character width for
        the current line of the original text */
        l1 = l1 + widths[0][j1];
        /* Increment the current character position of
        the current line of the original text */
        j1++;
        } else
        {
        /* Add the current character pointed to by the
        current position variable, j1, of the
        current line of the updated text to the fifth
        buffer */
        bothchar[j] = page2[i][j2];
        /* Add the current cumulative character width for
        the updated text to the sixth buffer */
        bothwidth[j] = l2;
        /* Calculate the cumulative character width total
        for the current line of the updated text */
        l2 = l2 + widths[1][j2];
        /* Increment the current character position of
        the current line of the updated text */
        j2++;
        }
    }
/* Calculate the difference between contiguate
cumulative character width totals */
    for (j = n1 + n2 - 1; j > 0; j—)
    {
        bothwidth[j] = bothwidth[j] - bothwidth[j - 1];
    }
    bothwidth[n1 + n2] = 0;
/* Call a function to display the contents of the
fifth buffer at the relative locations of the sixth
buffer. Display the updated text */
```

TABLE 3-continued

```
        GpiCharStringPosAt ( n1 + n2, bothchar, bothwidth
            +1);
    } else
    /* If the function DoPage is not required to update
    any text display the first page of the original text
    */
        GpiCharStringPosAt ( n1, page1[i], widths[0]);
    }
}
```

An alternative embodiment of the present invention described hereinafter not only reduces flicker or flash but substantially minimizes the area of blank screen perceived by the user when an update is effected.

Figure 10:
FIG. 10 shows two buffers containing an original and an updated text and their corresponding end character positions prior to effecting an update according to a second embodiment of the present invention.

The original 125 and updated 130 texts are held in buffers as described above. The character end positions 1000, 1005 of each character are calculated from the corresponding character widths 140 and 145 and stored in the second 105 and fourth 115 buffers, as exemplified by FIG. 10. It will again be appreciated that the microprocessor 155 executing the relevant addressing instructions to access either a read-only or random-access memory suitably programmed with a table of font metrics taken together can constitute a means for determining the width of each character used within the system when displaying text.

Figure 11:
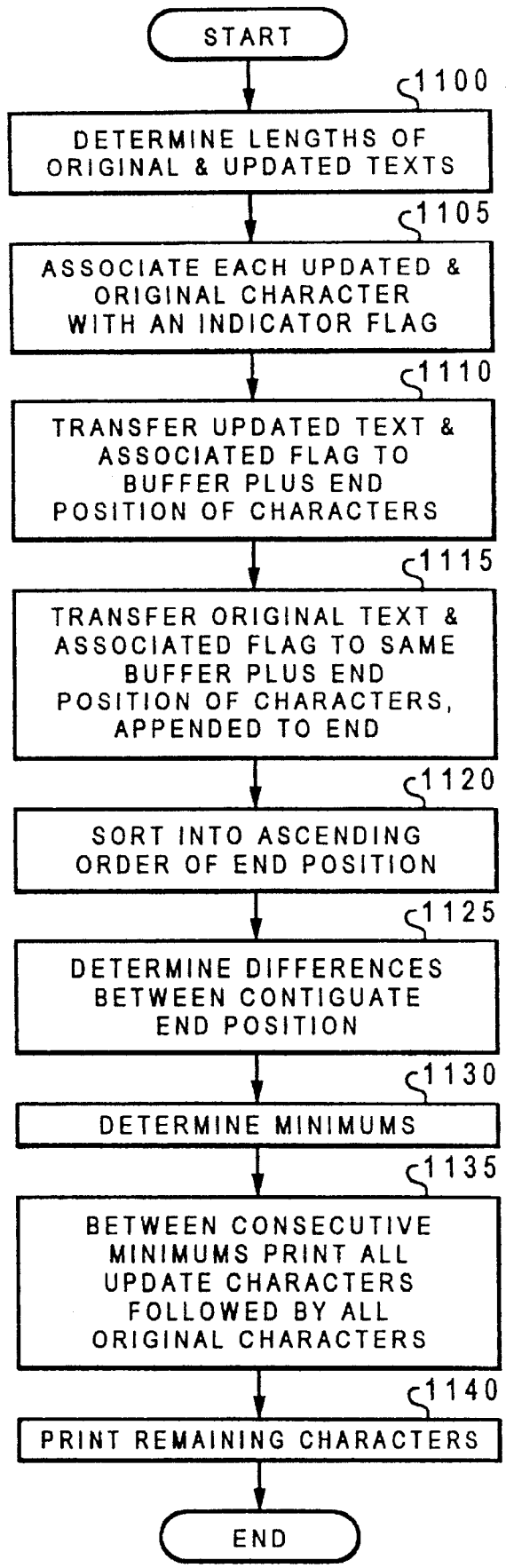
FIG. 11 shows a flow diagram for effecting an update according to a second embodiment of the present invention.

In FIG. 11 there is shown a flow diagram for effecting an update according to the second embodiment of the present invention. The lengths of the updated and original texts and their corresponding end positions are determined at 1100. The microprocessor in conjunction with the arithmetic and logic unit and suitably executed instructions constitute a means for calculating and associating with each character of the updated and original texts a corresponding character end position according to said character width determination. A flag is associated with each character of the original 125 and updated 130 texts for the purpose of indicating whether a particular character is an update or original character at 1105. The association of the flag is for the purpose of distinguishing whether the character is taken from the updated 130 or original 125 text when later printing all characters of a particular type between consecutive minima. The character end positions and the associated flags are transferred to the fifth 160 and sixth 165 buffers respectively, all updated characters followed by all original characters, at 1110 and 1115. An appropriate sorting technique is utilized at 1120 to arrange the contents of the fifth 160 and sixth 165 buffers in ascending order of character end position. The microprocessor 155 executing instructions effecting, say, a bubble sort, and the buffers stored in random access memory 120 taken together can constitute a means for arranging the character end positions and flags within the common buffer according to the each character end position. The difference between contiguate character end positions is calculated at 1125. The minima of said differences are identified at 1130. The microprocessor executing instructions for a suitable minima search algorithm can constitute a means for identifying the minima of said differences thereby determining where the original and updated texts have the closest match in terms of character end positions.

All update characters followed by all original characters between consecutive minima are displayed at 1135. All remaining characters are displayed at 1140. Again, the use of suitable functions as described in IBM's Operating System/2 Presentation Manager together with the microprocessor 155 and video display unit 170 can constitute a means responsive to said minima and said character end positions for displaying all updated characters followed by all original characters between consecutive minima thereby incrementally displaying and deleting characters the updated and original texts respectively such that an original character is deleted only upon prior replacement by an appropriate number of updated text characters resulting in a smooth text update.

Figure 12:
FIG. 12 shows a pair of buffers containing the associated character end positions and flag of the updated and original texts respectively.

Referring to FIG. 12, the character end positions 1000 and 1005 of the original 125 and updated 130 texts and corresponding flag 1200, indicating whether that character end position is associated with a character of the original 125 updated 130 text, are incorporated into the sixth 165 and a seventh 1205 buffer respectively.

Figure 13:
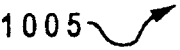
FIG. 13 shows a pair of buffers containing the associated character end positions and corresponding flag of the updated and original texts arranged according to ascending character end position.

The character end positions and corresponding flags are then sorted into ascending order of character end position using a bubble sort, as exemplified by FIG. 13. It will be apparent to one skilled in the art that notwithstanding the use of a bubble sort in the present invention it can equally well be implemented using other sort methods.

Figure 14:
FIG. 14 shows three buffers containing the difference between contiguate associated character end positions, corresponding flags and original and updated characters all arranged according to ascending character end positions.

The difference between contiguate character end positions, e.g. "55" 1300 and "51" 1305, contained in the sixth buffer 165 are calculated, working from right to left, and the resultant, "4" 1400 in the given example, is stored back in the same buffer, as shown in FIGS. 13 and 14.

Last and current character position pointers are initialized for both the original 125 and updated 130 texts. Each time a character end position in the fifth buffer is examined in order to determined whether it is a minimum, the corresponding flag of that character end position is also examined. If the flag indicates that that character end position is associated with a character from the original text 125 the current character position pointer of the original text is incremented by one. If the flag indicates that that character end position is associated with a character from the updated text 130 the current character position pointer of the updated text is incremented by one.

A minimum in the context of the present invention is a difference which is less than or equal to its predecessor and less than its successor. Referring to FIG. 14, it can be seen that the minimums are one 1110, one 1115, zero 1120 and two 1125.

Once a minimum is located all update text characters between the last update character pointer and the current update character pointer are written to the screen or display buffer followed by writing all original characters between the last original character pointer and the current original character pointer thereby displaying all characters between consecutive minima. For example, it can be seen that upon locating the first minimum 1110 the last and current update character pointers would have the values zero and two respectively and the last and current original character pointers would both have the value 0. Consequently, the updated characters "i" 210, "j" 900 and "k" 905 followed by the original character "A" 205 would be written to the screen or display area. This order of writing ensures that the blank area of screen encountered in the prior art is substantially minimized or obviated.

Immediately following the location of a minimum and subsequent partial update the last update character pointer is set to equal the current update character pointer plus one. Similarly for the last original character pointer.

The above is repeated for all minima. A situation can be envisaged in which there are no more minima in the buffer but there still remains characters to be written to the display, such as the "t" 965 in the given example. The remaining characters, from the current update character position of the updated text 130 followed by the remaining characters from the current original character position of the original text 125 are written to the screen or display area thereby completing an update with substantially minimized or eradicated flicker.

Figure 15A:
FIGS. 15A to 15N illustrate how the arranged characters, corresponding character end positions and flags are utilized when writing the updated text to and removing the original text from the display means according to a second embodiment of the present invention.
Figure 15A:
Figure 15B:
Figure 15B:
Figure 15C:
Figure 15C:
Figure 15D:
Figure 15D:
Figure 15E:
Figure 15E:
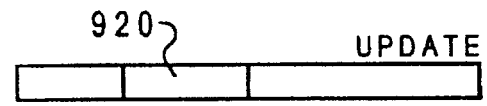
Figure 15F:
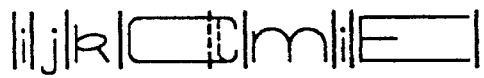
Figure 15F:
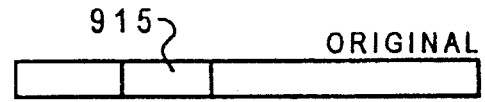
Figure 15G:
Figure 15G:
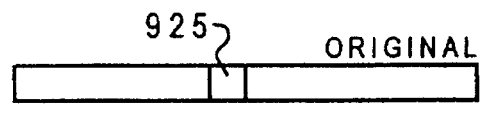
Figure 15H:
Figure 15H:
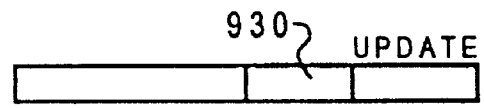
Figure 15I:
Figure 15J:
Figure 15K:
Figure 15L:
Figure 15M:
Figure 15N:

Consequently, the order and effect of writing the interleaved text in conjunction with the position information is as follows:

(a) the characters "i" 210, "j" 900 and "k" 905 are written, thereby displaying those characters, as exemplified by FIGS. 15B, 15C and 15D. It can be seen in FIG. 15C that there is a region of overlap 1500 with the original text letter "B" 915 when the "k" 905 is written;

(b) the "A" 205 is written, thereby deleting the existing "A", as per FIG. 15D;

(c) the "C" 920 is written, thereby displaying that character, as illustrated by FIG. 15E;

(d) the "B" 915 and "l" 925 are written, thereby deleting the existing "B" and "l" as shown in FIGS. 15F and 15G;

(e) the "D" 930 is written, thereby displaying that character, as shown in FIG. 15H;

(f) characters "m" 940 and "i" 945 are written, thereby deleting those characters, as depicted by FIGS. 15I and 15J;

(g) the characters "r" 955 and "s" 960 are written, thereby displaying those characters, as depicted in FIGS. 15K and 15L;

(h) the "E" 950 is written, thereby deleting the existing "E", as illustrated by FIG. 15M; and (i) finally, the character "t" 965 is written, thereby displaying that character, as shown in FIG. 15M.

Table 4 illustrates the pseudo-code for certain aspects of the second embodiment of the present invention.

TABLE 4

```
/* Reserve storage space for buffers
10 DIM A(8): /* buffer for original character widths
20 DIM B(8): /* buffer for update character widths
30 DIM A$(8): /* buffer for original character string
40 DIM B$(8): /* buffer for update character string
50 DIM C(16)
60 DIM C$(16), O$(30), O(30)
70 DIM S(16): /* buffer to hold sorted end length values
80 DIM S$(16): /* buffer to hold corresponding character
types for end values
81 N1=length of original text string
82 N2=length of update text string
90 /* Read in data for original and updated strings plus
their lengths
100 FOR N=0 TO N1-1 : READ A(N):NEXT:FOR N=1 TO
N1-1:A(N)=A(N)+A(N-1):NEXT
110 FOR N=0 TO N2-1 : READ B(N) :NEXT:FOR N=1 TO
```

TABLE 4-continued

```
N2-1:B(N)=B(N)+B(N-1):NEXT
120 FOR N=0 TO N1-1 : READ A$(N):NEXT
130 FOR N=0 TO N2-1 : READ B$(N):NEXT
140 DATA 5,6,2,5,1,7
150 DATA 1,2,3,7,6,3,3,2
150 DATA "A", "B", "1", "m", "i", "E"
170 DATA "i,, "j", "k", "C", "D", "r", "s", "t
200 N=0 /* Copy data plus char type into single array and
assign flag
210 FOR J=0 TO N2-1:S(N)=B(J):S$(N)="U":N=N+1;NEXT: /* Copy
update into array first
/* Copy data from original string into single buffer
220 FOR J=O TO N1-1:S(N)=A(J):S$(N)="O":N=N+1:NEXT: /* Copy
original into array second
260 /* SORT OUT BUFFRER INTO ASCENDING ORDER
270 FOR N=0 TO N1+N2-1
280 FOR M=N+1 TO N1+N2-1
290 IF S(N)>S(M) THEN
T=S(N):T$=S$(N):S(N)=S(M):S$(N)=S$(M):S(M)=T:S$(M)=T$: /*
SWAP over order of number plus character type
300 NEXT
310 NEXT
340 /* determine differences between contiguate pairs
350 FOR N=N1+N2-1 TO 1 STEP -1: S(N)=S(N)-S(N-1): NEXT N
380 /* determine minimums
390 LORIG=0:LUPDATE=0 /* Initialize last and current update
pointers for the original and updated texts
410 CORIG=-1:CUPDATE=0:LMIN=0:0=0
420 FOR N=1 TO N1+N2-1
430 IF S$(N)="U" THEN CUPDATE=CUPDATE+1; /* increment
current update character pointer
440 IF S$(N)="0" THEN CORIG=CORIG+1 /* increment current
original character pointer
460 IF (S(N)<=S(N-1))AND(S(N)<S(N+1)) THEN FOR M=LUPDATE TO
CUPDATE:
0$(0)=B$(M):0(0)=B(M):0=0+1:NEXT M:LUPDATE=CUPDATE+1 /* If
minimum then write all update characters between the last
and current update character pointers inclusively to the
screen or display buffer.
470 IF (S(N)<=S(N-1))AND(S(N)<S(N+1)) THEN FOR M=LORIG TO
CORIG:0$=A$(M):0(0)=A(M):0=0+1:NEXT M: LORIG=CORIG+1 /*
If minimum then write all original characters between the
last and current original character pointers inclusively to
the screen or display buffer.
490 NEXT N
500 /* TRANSFER REMAINING CHARACTERS TO SCREEN OR DISPLAY
BUFFER
510 IF LUPDATE<=CUPDATE THEN FOR N=CUPDATE TO
N2-1:0$(0)=B$(N):0(0)=B(N):0=0+1:NEXT
520 IF LORIG<=CORIG THEN FOR N=CORIG TO
N1-1:0$(0)=A$(N):0(0)=A(N):0=0+1:NEXT
/* DISPLAY CONTENTS OF DISPLAY BUFFER AT THE CORRESPONDING
RELATIVE LOCATIONS
```

The embodiments of the present invention described above advantageously reduce or substantially eradicate flicker or flash caused when updating text using proportionally spaced fonts.

While the invention has been particularly shown and described with reference to a preferred embodiment, it will be understood by those skilled in the art that various changes in form and detail may be made therein without departing from the spirit and scope of the invention.

What is claimed is:

1. A text display system including means for receiving and storing an original text, means for receiving and storing an updated text reflecting changes to said original text and means for displaying said updated text using proportionally spaced fonts, said system comprising:

means for determining the width of each character used within the system when displaying said characters;

means for associating each character of the updated and original texts with a corresponding character width according to said character width determination;

means for sequentially accessing each associated character width of the original and updated texts respectively;

means for calculating a cumulative character width for each character of both the original and updated texts and comparing said cumulative character widths to identify the lesser;

means for interleaving the characters of the original and updated texts and associated cumulative character widths by sequentially storing each said lesser cumulative character width and each associated character in a first and second buffer respectively thereby establishing the order of display of said interleaved characters according to each original and updated cumulative character width;

means for calculating the difference between contiguous interleaved cumulative character widths thereby determining ta display position for each interleaved character; and means for sequentially displaying said interleaved characters according to said order at said display positions thereby incrementally displaying and deleting characters of the updated and original texts respectively such that an original character is deleted and replaced by an appropriate number of updated text characters resulting in a smooth text update.

2. A text display system as claimed in claim 1 wherein the maximum widths of the updated or original texts correspond to the maximum number of pixels constituting a single line of a display area.

3. A text display system as claimed in claim 2 wherein a display area corresponds to a window.

4. A text display system as claimed in claim 3 wherein the size of the window corresponds to the complete screen of the display means.

5. A text display system as claimed in claim 1 further comprising means responsive to the total width of the updating text for determining whether a single line or a partial or complete screen or display area update is required.

6. A text display system including means for receiving and storing an original text, means for receiving and storing an updated text reflecting the changes to said original text and means for displaying said updated text according to proportionally spaced fonts, said system comprising:

means for determining the width of each character when displaying said characters;

means for calculating and associating with each character of the updated and original texts a corresponding character end position according to said character width determination;

means for associating a flag indicating a character type with each character of the original and updated texts;

means for copying all said associated character end positions and flags to a common buffer;

means for arranging the character end positions and flags within the common buffer according to the character end positions;

means for calculating the difference between contiguous arranged character end positions and storing said differences back in said common buffer;

means for identifying the minima of said differences thereby determining where the original and updated texts have the closest match in terms of character end positions; and means responsive to said minima and said character end positions for displaying all updated characters followed by all original characters between consecutive minima thereby incrementally displaying and deleting characters of the updated and original texts respectively such that an original character is deleted only upon prior replacement by an appropriate number of updated text characters resulting in a smooth text update.

7. A text display system as claimed in claim 6 wherein the maximum width of the updated or original texts is less than or equal to the maximum number of pixels constituting a display area or screen.

8. A text display system as claimed in claim 7 wherein a display area corresponds to a window.

9. A text display system as claimed in claim 6 further comprising means responsive to the total width of the updating text for determining whether a single line or a partial or complete screen or display area update is required.

10. A method of text display including receiving and storing an original text, receiving and storing an updated text reflecting changes to said original text and displaying said updated text using proportionally spaced fonts, said method comprising the steps of:

determining the width of each character when displaying said characters;

associating each character of the updated and original texts with a corresponding character width according to said character width determination;

sequentially accessing each character and associated character width of the original and updated texts respectively;

calculating a cumulative character width for each character of both the original and updated texts and comparing said cumulative character widths to identify the lesser;

interleaving the characters of the original and updated texts and associated cumulative character widths by sequentially storing each said lesser cumulative character width and each associated character in a first and second buffer respectively thereby establishing the order of display of said interleaved characters according to each original and updated cumulative character width;

calculating the difference between contiguous interleaved cumulative characters widths thereby determining a display position for each interleaved character; and sequentially displaying said interleaved characters according to said order at said display positions thereby incrementally displaying and deleting characters of the updated and original texts respectively such that an original character is deleted and replaced by an appropriate number of updated text characters resulting in a smooth text update.

11. A method of text display as claimed in claim 10 wherein the maximum widths of the updated or original texts correspond to the maximum number of pixels constituting a single line of a display area.

12. A method of text display as claimed in claim 11 wherein the maximum width of the updated or original texts is less than or equal to the maximum number of pixels constituting a display area or screen.

13. A method of text display as claimed in claim 12 wherein a display area corresponds to a window.

14. A method of text display as claimed in claim 13 wherein the size of the window corresponds to the complete screen of the display means.

15. A method of text display as claimed in claim 14 further comprising means responsive to the total width of the updating text for determining whether a single line or a partial or complete screen or display area update is required.

16. A method of text display including receiving and storing an original text, receiving and storing an updated text reflecting the changes to said original text and displaying said updated text according to proportionally spaced fonts, said method comprising the steps of:

determining the width of each character used within the system when displaying said characters;

calculating and associating with each character of the updated and original texts a corresponding character end position according to said character width determination;

associating a flag indicating a character type with each character of the original and updated texts;

copying all said associated character end positions and flags to a common buffer;

arranging the character end positions and flags within the common buffer according to the character end positions;

calculating the difference between contiguous arranged character end positions and storing said differences back in said common buffer;

identifying the minima of said differences thereby determining where the original and updated texts have the closes match in terms of character end positions; and displaying all updated characters followed by all original characters between consecutive minima thereby incrementally displaying and deleting characters of the updated and original texts respectively such that an original character is deleted only upon prior replacement by an appropriate number of updated text characters resulting in a smooth text update.

17. A method of text display as claimed in claim 16 wherein the maximum widths of the updated or original texts correspond to the maximum number of pixels constituting a single line of a display area.

18. A method of text display as claimed in claim 17 wherein the maximum width of the updated or original texts is less than or equal to the maximum number of pixels constituting a display area or screen.

19. A method of text display as claimed in claim 18 wherein a display area corresponds to a window.

20. A method of text display as claimed in claim 19 wherein the size of the window corresponds to the complete screen of the display means.

21. A method of text display as claimed in claim 20 further comprising means responsive to the total width of the updating text for determining whether a single line or a partial or complete screen or display area update is required.

* * * * *

UNITED STATES PATENT AND TRADEMARK OFFICE
CERTIFICATE OF CORRECTION

PATENT NO. : 5,563,626
DATED : October 8, 1996
INVENTOR(S) : Speed

It is certified that error appears in the above-indentified patent and that said Letters Patent is hereby corrected as shown below:

Column 11, line 10:  insert --11 = 0,-- before "12 = 0;"

Column 11, line 27:  insert --increment the current character position of the-- before "original"

Column 15, line 8:  replace "150" with --160--

Signed and Sealed this

Twenty-fourth Day of December, 1996

Attest:

BRUCE LEHMAN

Attesting Officer

Commissioner of Patents and Trademarks